United States Patent
Tomiuga (10) Patent No.: US 10,370,059 B2
(45) Date of Patent: Aug. 6, 2019

(54) FRONT FORK (71) Applicant: KYB Motorcycle Suspension Co., Ltd., Gifu (JP)

(72) Inventor: Takeshi Tomiuga, Gifu (JP)

(73) Assignee: KYB MOTORCYCLE SUSPENSION CO., LTD., Gifu (JP)

(*) Notice: Subject to any disclaimer, the term of this patent is extended or adjusted under 35 U.S.C. 154(b) by 0 days.

(21) Appl. No.: 15/562,118

(22) PCT Filed: Apr. 6, 2016

(86) PCT No.: PCT/JP2016/061217
§ 371 (c)(1),
(2) Date: Sep. 27, 2017

(87) PCT Pub. No.: WO2016/170979
PCT Pub. Date: Oct. 27, 2016

(65) Prior Publication Data
US 2018/0079466 A1 Mar. 22, 2018

(30) Foreign Application Priority Data

Apr. 20, 2015 (JP) ................................. 2015-085728

(51) Int. Cl.
B62K 25/08 (2006.01)
F16F 9/44 (2006.01)
(Continued)

(52) U.S. Cl.
CPC ............... *B62K 25/08* (2013.01); *F16F 9/19* (2013.01); *F16F 9/44* (2013.01); *F16F 9/462* (2013.01); *F16F 9/466* (2013.01)

(58) Field of Classification Search
CPC ... B62K 25/08; F16F 9/32; F16F 9/342; F16F 9/348; F16F 9/44; F16F 9/19
(Continued)

(56) References Cited

U.S. PATENT DOCUMENTS 3,848,710 A * 11/1974 Thompson ............... F16F 9/42
137/516.11
4,964,625 A * 10/1990 Kawamura ............ F16F 9/49
188/284
(Continued)

FOREIGN PATENT DOCUMENTS

CN 101570227 A 11/2009
JP 2004-251430 A 9/2004
(Continued)

OTHER PUBLICATIONS

Sep. 28, 2018, Chinese Office Action issued for related CN application No. 201680020748.5.

*Primary Examiner* — Joseph M Rocca
*Assistant Examiner* — Conan D Duda
(74) *Attorney, Agent, or Firm* — Paratus Law Group, PLLC (57) ABSTRACT There is provided a front fork which has a small number of components with simple structure and is easy to assemble. In order to achieve the above object, in a front fork F according to the means for solving the problem of the present invention, first and second adjusters 5, 6 are mounted on a cap 4 so as to be axially movable, and a contact portion 52 of the first adjuster 5 in contact with a first adjustment rod 7 and a contact portion 62 of the second adjuster 6 in contact with a second adjustment rod 8 are displaced in an axial direction of a vehicle body tube 2 so as not to interfere with each other. Therefore, even when each of the first and second adjusters 5, 6 moves in the axial direction with respect to the cap 4, the corresponding first and second adjustment rods 7, 8 can be moved independently without being interfered with each other.

7 Claims, 3 Drawing Sheets (51) Int. Cl.
*F16F 9/19* (2006.01)
*F16F 9/46* (2006.01)

(58) Field of Classification Search
USPC ..................................................... 280/276
See application file for complete search history.

(56) References Cited

U.S. PATENT DOCUMENTS

| | | | | |
|---|---|---|---|---|
| 5,301,973 A * | 4/1994 | Truchinski | ............ | B62K 25/06 267/177 |
| 5,598,904 A * | 2/1997 | Spyche, Jr. | ............... | F16F 9/34 188/287 |
| 6,767,024 B1 * | 7/2004 | Kuo | ....................... | B62K 25/08 188/285 |
| 7,131,755 B1 * | 11/2006 | Feng | ....................... | B62J 6/005 362/473 |
| 8,596,663 B2 * | 12/2013 | Shirai | ..................... | F16F 9/462 188/275 |
| 8,813,922 B2 * | 8/2014 | Mochizuki | ............... | F16F 9/34 188/313 |
| 9,534,652 B2 * | 1/2017 | Xu | .......................... | F16F 9/067 |
| 10,081,408 B2 * | 9/2018 | Yoshida | ................ | B62K 25/08 |
| 2003/0001358 A1 * | 1/2003 | Becker | .................. | B62K 25/08 280/276 |
| 2003/0001359 A1 * | 1/2003 | Miyabe | ................. | B62K 25/08 280/276 |
| 2004/0145101 A1 * | 7/2004 | Olds | ....................... | B62K 25/08 267/64.28 |
| 2004/0201145 A1 * | 10/2004 | Chen | ...................... | B62K 25/08 267/64.11 |
| 2004/0262879 A1 * | 12/2004 | Kinzler | .................. | B62K 21/20 280/276 |
| 2007/0074939 A1 * | 4/2007 | Chen | ...................... | B62K 25/08 188/297 |
| 2008/0116622 A1 * | 5/2008 | Fox | ....................... | B62K 25/08 267/64.28 |
| 2008/0230335 A1 * | 9/2008 | Furuya | .................. | B62K 25/08 188/315 |
| 2008/0258420 A1 * | 10/2008 | Fuse | ...................... | B62K 25/08 280/124.179 |
| 2009/0026656 A1 | 1/2009 | Bautista, Jr. et al. | | |
| 2009/0065316 A1 * | 3/2009 | Chen | ...................... | B62K 25/08 188/322.14 |
| 2009/0266656 A1 * | 10/2009 | Murakami | ........... | B60G 15/061 188/266.1 |
| 2010/0207350 A1 * | 8/2010 | Uchiyama | ............... | B62K 25/08 280/276 |
| 2010/0219569 A1 * | 9/2010 | Mori | ...................... | B62K 25/08 267/127 |
| 2010/0225081 A1 * | 9/2010 | Galasso | .................. | B62K 25/08 280/124.1 |
| 2010/0236882 A1 * | 9/2010 | Uchiyama | ............... | B62K 25/08 188/322.15 |
| 2010/0294605 A1 * | 11/2010 | Mochizuki | ............ | B62K 25/08 188/297 |
| 2012/0080865 A1 * | 4/2012 | Chen | ........................ | B62H 5/14 280/276 |
| 2012/0205843 A1 * | 8/2012 | Allen | ....................... | B60G 15/12 267/64.25 |
| 2012/0255822 A1 | 10/2012 | Ito | | |
| 2013/0093158 A1 * | 4/2013 | Schwindt | ............... | B62K 25/08 280/276 |
| 2013/0221634 A1 * | 8/2013 | Aoki | ....................... | B62K 25/08 280/276 |
| 2014/0124313 A1 * | 5/2014 | Ericksen | ................ | B62K 25/08 188/322.13 |
| 2014/0167380 A1 * | 6/2014 | Ogura | .................... | B62K 25/08 280/276 |
| 2014/0210146 A1 * | 7/2014 | Aoki | ....................... | B62K 25/08 267/64.11 |
| 2014/0252706 A1 * | 9/2014 | Kamioka | ............... | B62K 25/08 267/217 |
| 2014/0291090 A1 * | 10/2014 | Shimasaki | ................ | F16F 9/34 188/315 |
| 2015/0054253 A1 * | 2/2015 | Pye | ........................ | B62K 25/08 280/276 |
| 2015/0096852 A1 * | 4/2015 | Yoshida | ................ | B62K 25/08 188/297 |
| 2015/0096853 A1 * | 4/2015 | Yoshida | ................ | F16F 9/341 188/313 |
| 2015/0137478 A1 * | 5/2015 | Shirai | .................... | B62K 25/08 280/283 |
| 2016/0215846 A1 * | 7/2016 | Noguchi | ................ | B62K 25/08 |
| 2016/0290432 A1 * | 10/2016 | Barefoot | ............... | F16F 13/007 |

FOREIGN PATENT DOCUMENTS

| | | |
|---|---|---|
| JP | 2009-264411 | 11/2009 |
| JP | 2011-058547 A | 3/2011 |
| JP | 2011-208660 | 10/2011 |
| JP | 2012-047341 | 3/2012 |
| JP | 5116874 B2 | 1/2013 |
| JP | 2015-063998 | 4/2015 |

* cited by examiner

FRONT FORK

CROSS REFERENCE TO PRIOR APPLICATION

This application is a National Stage Patent Application of PCT International Patent Application No. PCT/JP2016/061217 (filed on Apr. 6, 2016) under 35 U.S.C. § 371, which claims priority to Japanese Patent Application No. 2015-085728 (filed on Apr. 20, 2015), which are all hereby incorporated by reference in their entirety.

TECHNICAL FIELD

The present invention relates to a front fork.

BACKGROUND ART

An example of a front fork that supports a front wheel of a straddle-riding vehicle includes one that is interposed between a vehicle body and a front wheel axle in a straddle-riding vehicle, exerting a damping force. Such a front fork typically includes a fork main body that is configured to extend/contract, provided with a vehicle body tube connected to the vehicle body of the straddle-riding vehicle and an axle tube fitted with the vehicle body tube and connected to the front wheel axle; and a damper cartridge that is housed in the fork main body and is configured to exert a damping force in accordance with extension/contraction of the fork main body.

The front fork described above may be provided with an adjuster for adjusting damping force characteristics so that the damping force characteristics can be changed to a characteristic desired by a user. For example, a front fork disclosed in JP-5116874-B2 adjusts spring forces of a spring that presses a valve for opening/closing a passage that connects two working chambers provided in a damper cartridge, and adjusts degrees of opening of a needle valve that bypasses this passage and narrows down a bypass passage communicating the two working chambers.

This front fork includes a valve adjustment rod configured to adjust the degrees of opening of the needle valve; and a spring adjustment rod provided to an outer periphery of this adjustment rod, configured to adjust the spring forces of the spring, and having a tubular shape. Two adjustment portions corresponding to the valve adjustment rod and the spring adjustment rod are provided to a cap provided to an upper end opening of a vehicle body tube. A valve adjuster nut that moves axially with respect to the vehicle body tube by rotation of the adjustment portion in the valve side is brought into contact with the valve adjustment rod, and a spring adjuster nut that moves axially with respect to the vehicle body tube by rotation of the adjustment portion in the spring side is brought into contact with the spring adjustment rod.

When the adjustment portion in the valve side is rotated, the valve adjuster nut moves upward and downward with respect to the vehicle body tube, and the valve adjustment rod can be moved upward and downward so that the degrees of opening of the needle valve can be adjusted. Furthermore, when the adjustment portion in the spring side is rotated, the spring adjuster nut moves upward and downward with respect to the vehicle body tube, and the spring adjustment rod can be moved upward and downward so that the spring forces of the spring can be adjusted. Accordingly, in this front fork, a user can easily change damping force characteristics of the front fork.

SUMMARY OF THE INVENTION

In the aforementioned front fork, the adjustment portion in the valve side and the adjustment portion in the spring side can both rotate about an axis with respect to the cap, and the valve adjuster nut which is in contact with the valve adjustment rod is screwed in the adjustment portion in the valve side, and the spring adjuster nut which is in contact with the spring adjustment rod is screwed to the adjustment portion in the spring side.

When the valve adjuster nut rotates together due to the rotation of the adjustment portion in the valve side, the valve adjuster nut cannot move upward and downward, and when the spring adjuster nut rotates together due to the rotation of the adjustment portion in the spring side, the spring adjuster nut cannot move upward and downward so that the damping force characteristics cannot be adjusted.

Therefore, in the front fork, the valve adjuster nut is provided with a hole allowing insertion of the adjustment portion in the spring side, and the spring adjuster nut is provided with a hole allowing insertion of the adjustment portion in the valve side. In this manner, the valve adjuster nut is prevented from rotating by the adjustment portion in the spring side and the spring adjuster nut is prevented from rotating by the adjustment portion in the valve side. However, the structure including the adjustment portion becomes complicated, which causes extremely troublesome assembly.

In addition to each adjustment portion, two adjuster nuts are required for pushing each adjustment rod, which causes such problems that the number of components increases and the cost increases.

The present invention has been made to solve the aforementioned problems, and an object of the present invention is to provide a front fork which has a small number of components with simple structure and is easy to assemble.

In order to achieve the above object, in a front fork according to the means for solving the problem of the present invention, first and second adjusters are mounted on a cap so as to be axially movable, and a contact portion of the first adjuster and a contact portion of the second adjuster are disposed as viewed in an axial direction of a vehicle body tube so as not to overlap with each other.

DESCRIPTION OF EMBODIMENTS

Figure 1:
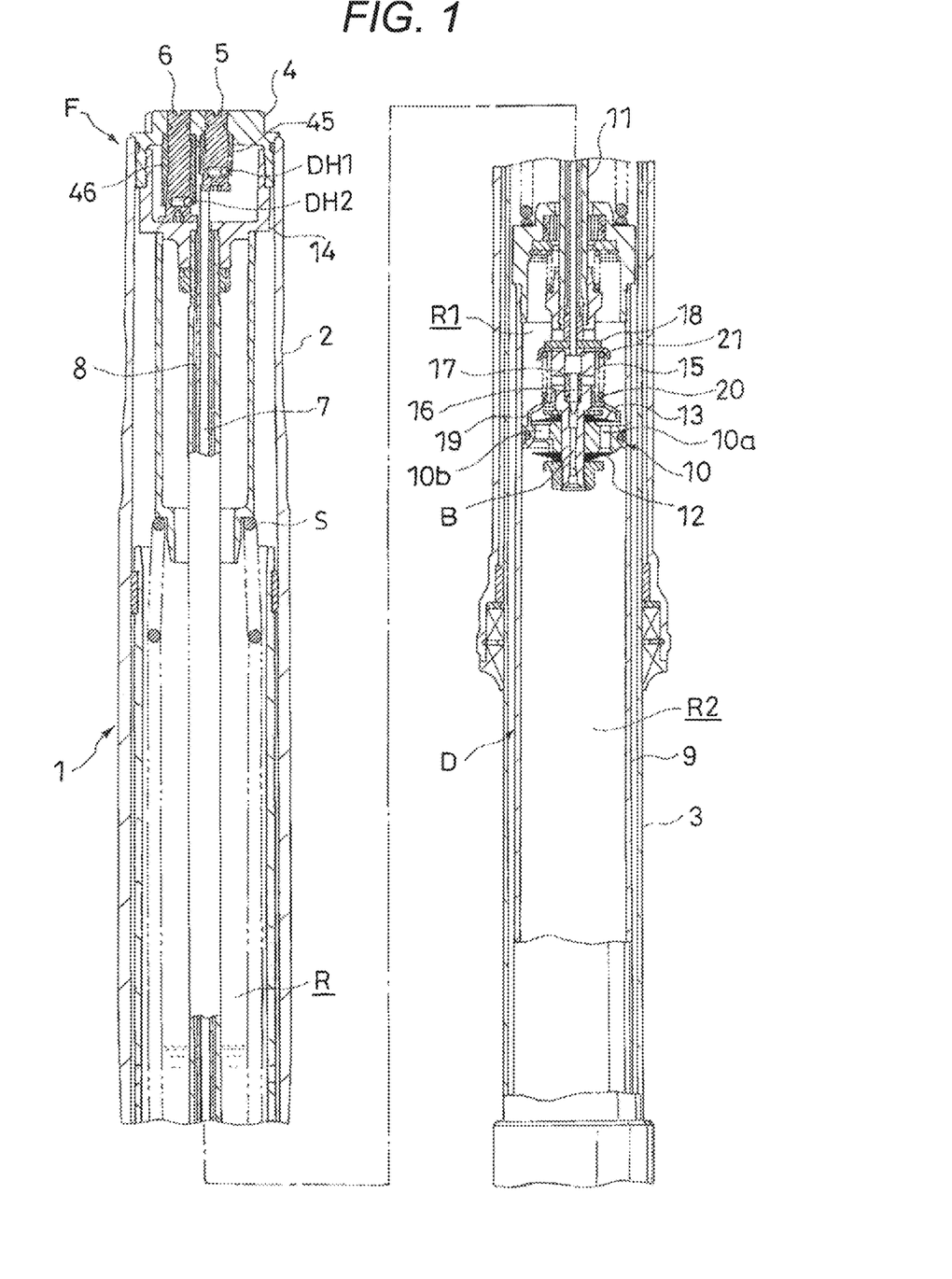
FIG. 1 is a longitudinal sectional view of a front fork according to an embodiment of the present invention.

The present invention will now be described based on an embodiment shown in the drawings. As shown in FIG. 1, a front fork F according to an embodiment of the present invention includes a fork main body 1 in which a vehicle body tube 2 and an axle tube 3 are slidably fitted; a cap 4 configured to close an upper end or an end portion of the vehicle body tube 2; first and second adjusters 5, 6 non-coaxially mounted on the cap 4; a first adjustment rod 7 housed in the vehicle body tube 2, disposed in the center of the vehicle body tube 2; and a second adjustment rod 8 housed in the vehicle body tube 2, disposed in an outer periphery of the first adjustment rod 7, and having a tubular shape.

Each part will be described below. The fork main body 1 is configured to be extendable/contractable by slidably inserting the axle tube 3 having a diameter smaller than that of the vehicle body tube 2 into the vehicle body tube 2, involving a bearing (not shown). It should be noted that the vehicle body tube 2 may be set to have a diameter smaller than that of the axle tube 3, and the vehicle body tube 2 may be inserted into the axle tube 3.

A damper cartridge D is housed in the fork main body 1, and this damper cartridge D extends/contracts in accordance with extension/contraction of the fork main body 1 so as to exert a damping force. The damper cartridge D includes a cylinder 9 fixed to a bottom cap (not shown) which closes a lower end opening of the axle tube 3; a piston 10 slidably inserted into the cylinder 9, partitioning the cylinder 9 into a chamber in the side of extension R1 filled with liquid and a chamber in the side of compression R2; and a piston rod 11 connected to the piston 10, slidably inserted into the cylinder 9, and connected to the cap 4 that closes an upper end opening of the vehicle body tube 2. Using a reservoir R filled with liquid and gas, an annular gap formed between the damper cartridge D and the fork main body 1 is communicated with the chamber in the side of compression R2 through holes (not shown) provided to this reservoir R and the cylinder 9. Accordingly, the liquid corresponding to a volume of the piston rod 11 that moves in and out of the cylinder 9 during extension/contraction is exchanged between the cylinder 9 and the reservoir R so as to supplement the volume. Operating oil can be used as the liquid. Furthermore, any other liquid is employable as long as it can exert a damping force.

The piston 10 has an annular shape, provided with a port in the side of extension 10a and a port in the side of compression 10b that allow the chamber in the side of extension R1 to communicate with the chamber in the side of compression R2. In a lower end of the piston 10 in FIG. 1, an annular leaf valve in the side of extension 12 that opens/closes the port in the side of extension 10a is laminated. In an upper end of the piston 10 in FIG. 1, an annular leaf valve in the side of compression 13 that opens/closes the port in the side of compression 10b is laminated. The piston 10, leaf valve in the side of extension 12, and leaf valve in the side of compression 13 are all mounted on an outer periphery of a piston connecting member 15 connected to a lower end of the piston rod 11 in FIG. 1. An inner periphery of the leaf valve in the side of extension 12 and that of the leaf valve in the side of compression 13 are fixed to the piston rod 11. An outer periphery of the leaf valve in the side of extension 12 and that of the leaf valve in the side of compression 13 are deflected away from the piston 10 and respectively open the port in the side of extension 10a and the port in the side of compression 10b.

The piston rod 11 has a tubular shape, and an upper end thereof in FIG. 1 is connected to the cap 4, involving a tubular adapter 14 screwed in the cap 4. The lower end of piston rod 11 in FIG. 1 is mounted with the piston connecting member 15 that connects the piston 10 with the piston rod 11.

Figure 2:
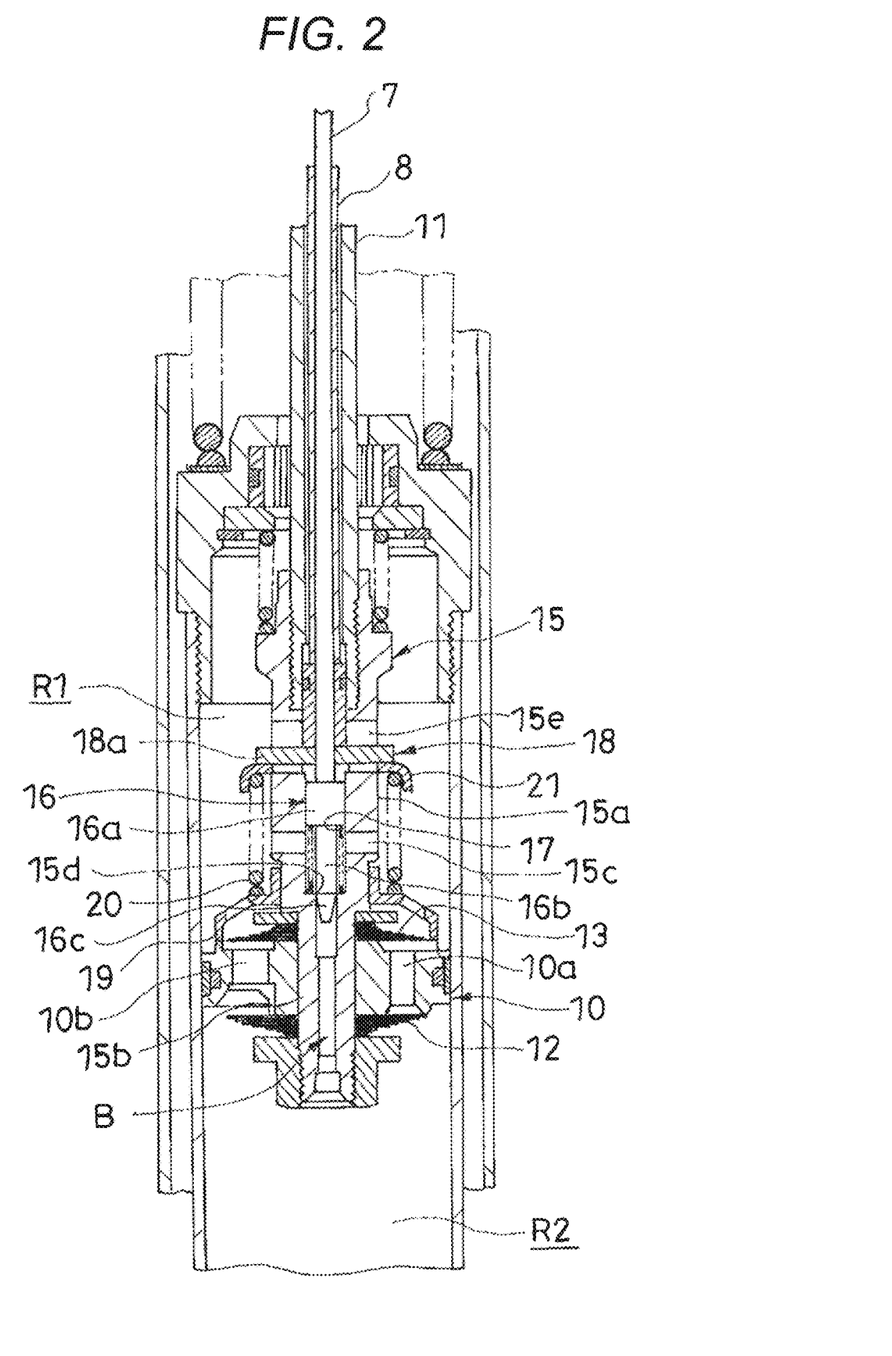
FIG. 2 is a partially enlarged longitudinal sectional view of a damper cartridge housed in the front fork according to the embodiment of the present invention.

As shown in FIG. 2, the piston connecting member 15 is formed in a tubular shape and includes a socket 15a having a tubular shape, screwed in an outer periphery of a leading end of the piston rod 11; a piston mounting shaft 15b having a tubular shape, extending downward in FIG. 2 from the socket 15a; a lateral hole 15c opening from a side of the socket 15a facing the chamber in the side of extension R1 so as to communicate with an inner part; an annular valve seat 15d provided to have a smaller inner diameter than the lateral hole 15c in a side closer to the chamber in the side of compression R2; and an elongated hole 15e axially provided to an upper part in FIG. 2 which is closer to the cap 4 than the lateral hole 15c of the socket 15a, allowing the inner part to communicate with an outer part.

The annular valve seat 15d is formed by providing a part that has a smaller inner diameter so as to form a stepped portion. However, the annular valve seat 15d may be formed by mounting a tubular or annular member inside the piston connecting member 15.

A lower end of the piston connecting member 15 faces the chamber in the side of compression R2 and the lateral hole 15c faces the chamber in the side of extension R1. Together with the lateral hole 15c, the lower end of the piston connecting member 15 forms a bypass passage B that is disposed inside the piston connecting member 15 and in a part closer to the chamber in the side of compression R2 than the lateral hole 15c, and is configured to bypass the port in the side of extension 10a and the port in the side of compression 10b so as to allow the chamber in the side of extension R1 to communicate with the chamber in the side of compression R2.

As shown in FIG. 2, the piston connecting member 15 houses a needle valve 16 that is axially movable and configured to be seated on or separated from the annular valve seat 15d. This needle valve 16 includes a base portion 16a slidably inserted into an inner periphery of the piston connecting member 15; a shaft portion 16b smaller in diameter than the base portion 16a, extending from the base portion 16a; and a valve body 16c provided to a leading end of the shaft portion 16b, configured to be seated on or separated from the annular valve seat 15d, and having a conical shape. A coil spring 17 is interposed between the base portion 16a and the stepped portion forming the annular valve seat 15d inside the piston connecting member 15, and the needle valve 16 is biased in a direction apart from the annular valve seat 15d.

An adjustment plate 18 having an annular shape is inserted inside the socket 15a of the piston connecting member 15 so as to be axially movable. This adjustment plate 18 is provided with an arm 18a that is inserted into the elongated hole 15e so as to extend outward. An outer periphery of the socket 15a is provided with a spring bearing 21 that has an annular shape and is axially movable. This spring bearing 21 is brought into contact with the arm 18a.

Furthermore, a slider 19 having an annular shape is slidably mounted on the outer periphery of the socket 15a of the piston connecting member 15. A lower end of the slider 19 in FIG. 2 is enlarged in diameter and is brought into contact with a surface, opposite to the piston, of an outer periphery of the leaf valve in the side of compression 13.

In the outer periphery of the socket 15a, a coil spring 20 serving as an adjustment spring is interposed in a compressed state between the slider 19 and the spring bearing 21. The leaf valve in the side of compression 13 is pushed toward the piston 10 by a biasing force of coil spring 20.

On the other hand, the second adjustment rod 8 having the tubular shape is inserted into the piston rod 11 so as to be axially movable, and this second adjustment rod 8 is inserted into the socket 15a of the piston connecting member 15 so as to push the adjustment plate 18 as shown in FIG. 2. Furthermore, the first adjustment rod 7 is inserted into the second adjustment rod 8 so as to be axially movable. As shown in FIG. 2, a lower end of the first adjustment rod 7 is bought into contact with an upper end of the needle valve 16 in FIG. 2 through the interior of the adjustment plate 18. As shown in FIG. 1, the first adjustment rod 7 is set to have an axial length longer than that of the second adjustment rod 8, and both ends of the first adjustment rod 7 are protruded outward from both ends of the second adjustment rod 8. An upper end of the first adjustment rod 7 and that of the second adjustment rod 8 in FIG. 1 are protruded outward from an upper end of the piston rod 11. The first and second adjustment rods 7, 8 are independently movable in the axial direction inside the piston rod 11.

Therefore, when the first adjustment rod 7 is pushed downward in FIG. 2 against a spring force of the coil spring 17, the valve body 16c of the needle valve 16 approaches the annular valve seat 15d. Conversely, when the first adjustment rod 7 is moved upward in FIG. 2, the needle valve 16 is pushed up by the coil spring 17, and the valve body 16c is separated from the annular valve seat 15d. In this manner, when the first adjustment rod 7 is moved upward or downward in FIG. 2, the needle valve 16 comes close to or draws apart from the annular valve seat 15d so that it is possible to adjust flow passage areas (degrees of valve opening) formed between the needle valve 16 and the annular valve seat 15d. It should be noted that what is provided to the bypass passage B is not limited to the needle valve 16 but may be a variable damping valve that is displaced inside the bypass passage B by the first adjustment rod 7 to vary flow passage areas or valve opening pressure.

When the second adjustment rod 8 is pushed downward in FIG. 2, the spring bearing 21 is pushed by the adjustment plate 18 and moves downward in FIG. 2 so as to compress the coil spring 20, which increases the biasing force of the coil spring 20 that pushes the leaf valve in the side of compression 13 toward the piston 10. Conversely, when the second adjustment rod 8 is moved upward in FIG. 2, the coil spring 20 pushes up the spring bearing 21 and the adjustment plate 18 so as to extend, which decreases the biasing force of the coil spring 20 that biases the leaf valve in the side of compression 13. In this manner, as the second adjustment rod 8 is moved upward or downward in FIG. 2, a degree of compression of the coil spring 20 and the biasing force change so that it is possible to adjust the valve opening pressure of the leaf valve in the side of compression 13.

In the front fork F configured as described above, extension of the fork main body 1 extends the damper cartridge D so that the chamber in the side of extension R1 is compressed by the piston 10. In a case where a speed of extension of the fork main body 1 is low and pressure of the chamber in the side of extension R1 is not sufficient enough to open the leaf valve in the side of extension 12, when the needle valve 16 is opened, the liquid inside the chamber in the side of extension R1 moves to the chamber in the side of compression R2 through the bypass passage B. Resistance offered by the needle valve 16 with respect to a flow of this liquid brings about a pressure difference between the chamber in the side of extension R1 and the chamber in the side of compression R2 so that the front fork F exerts a damping force for preventing the extending operation. In a case where the speed of extension of the fork main body 1 becomes high and the pressure of the chamber in the side of extension R1 becomes sufficient enough to open the leaf valve in the side of extension 12, when the needle valve 16 is opened, the liquid inside the chamber in the side of extension R1 moves to the chamber in the side of compression R2 through not only the bypass passage B but also the port in the side of extension 10a. Resistance offered by the needle valve 16 and the leaf valve in the side of extension 12 with respect to a flow of this liquid brings about a pressure difference between the chamber in the side of extension R1 and the chamber in the side of compression R2 so that the front fork F exerts a damping force for preventing the extending operation.

Herein, the degrees of valve opening of the needle valve 16 can be changed by moving the first adjustment rod 7 in the axial direction so that it is possible to adjust damping force characteristics in the side of extension of the front fork F (damping force characteristics with respect to a speed of extension/contraction).

Contraction of the fork main body 1 contracts the damper cartridge D so that the chamber in the side of compression R2 is compressed by the piston 10. In a case where a speed of contraction of the fork main body 1 is low and pressure of the chamber in the side of compression R2 does not reach the valve opening pressure of the leaf valve in the side of compression 13, when the needle valve 16 is opened, the liquid inside the chamber in the side of compression R2 moves to the chamber in the side of extension R1 through the bypass passage B. Resistance offered by the needle valve 16 with respect to a flow of this liquid brings about a pressure difference between the chamber in the side of compression R2 and the chamber in the side of extension R1 so that the front fork F exerts a damping force for preventing the contracting operation. In a case where the speed of contraction of the fork main body 1 becomes high and the pressure of the chamber in the side of compression R2 reaches the valve opening pressure of the leaf valve in the side of compression 13, when the needle valve 16 is opened, the liquid in the chamber in the side of compression R2 moves to the chamber in the side of extension R1 through not only the bypass passage B but also the port in the side of compression 10b. Resistance offered by the needle valve 16 and the leaf valve in the side of compression 13 with respect to a flow of this liquid brings about a pressure difference between the chamber in the side of compression R2 and the chamber in the side of extension R1 so that the front fork F exerts a damping force for preventing the contracting operation.

Herein, the valve opening pressure of the leaf valve in the side of compression 13 can be changed by moving the second adjustment rod 8 in the axial direction so as to change amounts of compression of the coil spring 20 so that it is possible to adjust damping force characteristics in the side of compression of the front fork F (damping force characteristics with respect to the speed of extension/contraction).

In this manner, in adjusting the displacement of the needle valve 16 by the first adjustment rod 7, it is possible to adjust the damping forces in the side of extension of the front fork F, and in adjusting the amounts of compression of the coil spring 20 of the second adjustment rod 8, it is possible to adjust the damping forces in the side of compression of the front fork F.

Figure 3:
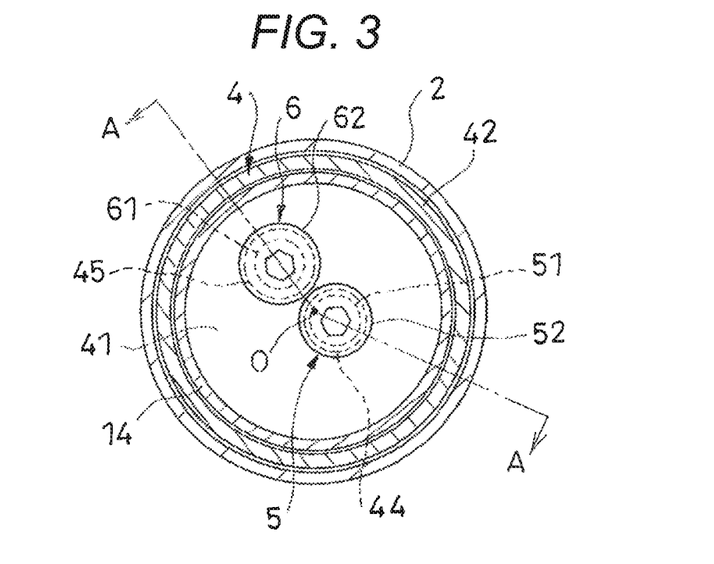
FIG. 3 is a plan view of a cap to which a first adjuster and a second adjuster are attached.
Figure 4:
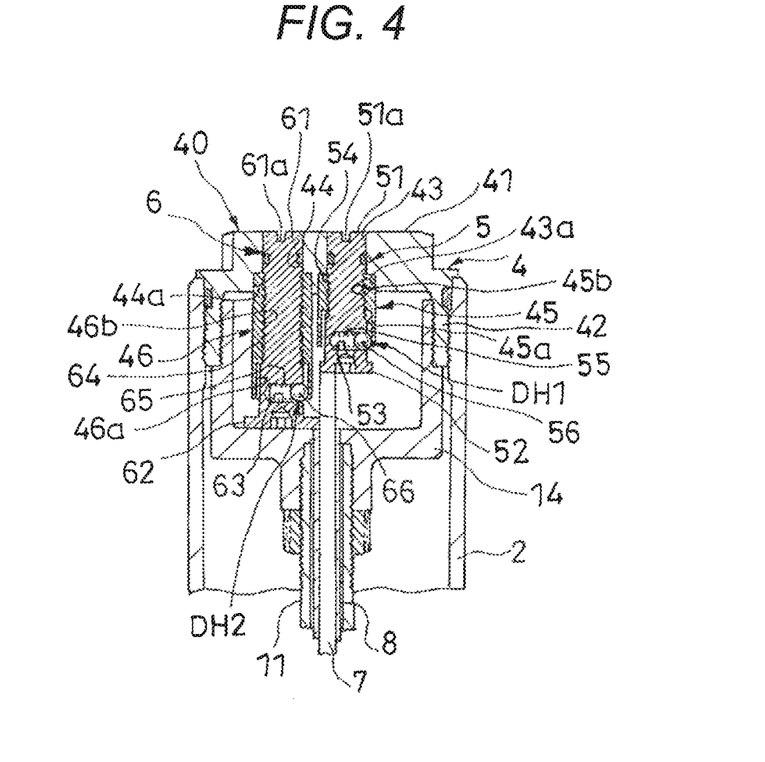
FIG. 4 is a cross sectional view, taken along the AA line, of the cap to which the first adjuster and the second adjuster are attached.

Subsequently, the first and second adjusters 5, 6 mounted on the cap 4 will be described in detail. As shown in FIGS. 3 and 4, the cap 4 includes a cap body 40 that is provided with a lid portion 41 having a disk-like shape and a tubular screw portion 42 provided to a lower end of the lid portion 41 in FIG. 3, having a tubular shape, and screwed in an inner periphery of the end portion of the vehicle body tube 2; first and second holes 43, 44 which penetrate the lid portion 41 in the axial direction; a first adjuster case 45 mounted on the first hole 43; and a second adjuster case 46 mounted on the second hole 44. The adapter 14 is screwed in an inner periphery of the tubular screw portion 42, and the piston rod 11 is connected to the cap 4.

As shown in FIG. 3, the first hole 43 is provided at a position that overlaps with a center O of the cap 4 as viewed in the axial direction of the cap 4; and the second hole 44 is provided at a position eccentric to the center O, separated from the first hole 43. The first and second holes 43, 44 are set to have a large diameter in the lower side and a small diameter in the upper side in FIG. 4 with respect to the lid portion 41.

As shown in FIG. 4, the first adjuster case 45 having a tubular shape is mounted on a large-diameter section 43a of the first hole 43 by press fitting; and the second adjuster case 46 having a tubular shape is mounted on a large-diameter section 44a of the second hole 44 by press fitting.

The first adjuster case 45 has the tubular shape, provided with a polygonal inner peripheral portion 45a having a polygonal cross sectional shape in the lower side in FIG. 4 of its inner periphery, and provided with a screw groove 45b in the upper side in FIG. 4 of the inner periphery. Similarly, the second adjuster case 46 has the tubular shape, provided with a polygonal inner peripheral portion 46a having a polygonal cross sectional shape in the lower side in FIG. 4 of its inner periphery, and provided with a screw groove 46b in the upper side in FIG. 4 of the inner periphery.

The first adjuster 5 includes a body 51 having a columnar shape; a contact portion 52 provided to a lower end of the body 51 in FIG. 4, brought into contact with an end face closer to the cap or an upper end face of the first adjustment rod 7 in FIG. 4, and having a disk-like shape; a blind hole 53 opening from a side; and a screw portion 54 provided to an outer periphery of the body 51, screwed in the screw groove 45b of the first adjuster case 45.

The first adjuster 5 is inserted into the first adjuster case 45 mounted on the cap 4 by press fitting, and the screw portion 54 is screwed in the screw groove 45b so that the first adjuster 5 is mounted on the cap 4. An upper end of the body 51 in FIG. 4 is provided with a groove 51a for allowing a leading end of a flat-blade screwdriver to be inserted thereinto. Using the screwdriver, the first adjuster 5 can be rotated with respect to the cap 4.

The blind hole 53 houses a coil spring 55, and a ball 56 biased to be protruded from the blind hole 53 by the coil spring 55. When the first adjuster 5 is inserted into the first adjuster case 45 and the screw portion 54 is screwed in the screw groove 45b, the blind hole 53 opposes the polygonal inner peripheral portion 45a of the first adjuster case 45. Therefore, the ball 56 is constantly pressed by the coil spring 55 toward the polygonal inner peripheral portion 45a. When the ball 56 faces a corner of the polygonal inner peripheral portion 45a, the coil spring 55 extends to the maximum. In this state, when the first adjuster 5 is rotated with respect to the first adjuster case 45, the coil spring 55 is compressed and exerts a resistance force to obstruct the rotation of the first adjuster 5, trying to keep the ball 56 in the position facing the corner in an inner periphery of the polygonal inner peripheral portion 45a. Therefore, the first adjuster 5 is set to a position corresponding to the corner of the polygonal inner peripheral portion 45a in a circumferential direction with respect to the first adjuster case 45, and is positioned by the number of corners provided to the polygonal inner peripheral portion. For example, in a case where the polygonal inner peripheral portion 45a has a hexagonal cross sectional shape, the first adjuster 5 is positioned by six points. In this manner, a first detent mechanism DH1 that positions the first adjuster 5 in the circumferential direction is configured by the coil spring 55, ball 56, and first adjuster case 45. The detent mechanism herein is an example so that it may be configured by a structure other than this example.

The second adjuster 6 includes a body 61 having a columnar shape; a contact portion 62 provided to a lower end of the body 61 in FIG. 4, brought into contact with an end face closer to the cap or an upper end face of the second adjustment rod 8 in FIG. 4, and having a disk-like shape; a blind hole 63 opening from a side; and a screw portion 64 provided to an outer periphery of the body 61, screwed in the screw groove 46b of the second adjuster case 46.

The second adjuster 6 is inserted into the second adjuster case 46 mounted on the cap 4 by press fitting, and the screw portion 64 is screwed in the screw groove 46b so that the second adjuster 6 is mounted on the cap 4. An upper end of the body 61 in FIG. 4 is provided with a groove 61a for allowing a leading end of a flat-blade screwdriver to be inserted thereinto. Using the screwdriver, the second adjuster 6 can be rotated with respect to the cap 4.

The blind hole 63 houses a coil spring 65, and a ball 66 biased to be protruded from the blind hole 63 by the coil spring 65. When the second adjuster 6 is inserted into the second adjuster case 46 and the screw portion 64 is screwed in the screw groove 46b, the blind hole 63 opposes the polygonal inner peripheral portion 46a of the second adjuster case 46. Therefore, the ball 66 is constantly pressed by the coil spring 65 toward the polygonal inner peripheral portion 46a. When the ball 66 faces a corner of the polygonal inner peripheral portion 46a, the coil spring 65 extends to the maximum. In this state, when the second adjuster 6 is rotated with respect to the second adjuster case 46, the coil spring 65 is compressed and exerts a resistance force to obstruct the rotation of the second adjuster 6, trying to keep the ball 66 in the position facing the corner in an inner periphery of the polygonal inner peripheral portion 46a. Therefore, the second adjuster 6 is set to a position corresponding to the corner of the polygonal inner peripheral portion 46a in the circumferential direction with respect to the second adjuster case 46, and is positioned by the number of corners provided to the polygonal inner peripheral portion. For example, in a case where the polygonal inner peripheral portion 46a has a hexagonal cross sectional shape, the second adjuster 6 is positioned by six positions. In this manner, a second detent mechanism DH2 that positions the second adjuster 6 in the circumferential direction is configured by the coil spring 65, ball 66, and second adjuster case 46. The detent mechanism herein is an example so that it may be configured by a structure other than this example.

As shown in FIGS. 3 and 4, the contact portion 52 of the first adjuster 5 and the contact portion 62 of the second adjuster 6 are disposed so as to be displaced from each other in the axial direction, and the contact portion 52 of the first adjuster 5 is disposed so as not to interfere with the second adjuster case 47 of the second adjuster 6. Furthermore, the bodies 51, 61 are also disposed in the cap 4 so as not to contact with each other. In other words, the first and second adjusters 5, 6 thoroughly do not interfere with each other.

When rotating the first adjuster 5 configured in such a manner, the first adjuster 5 is screwed in the first adjuster case 45 that is included in a part of the cap 4 and can be moved axially with respect to the cap 4 so that the first adjustment rod 7 in contact with the contact portion 52 can be moved axially. Therefore, due to the rotation of the first adjuster 5 with respect to the cap 4, it is possible to change the degrees of valve opening of the needle valve 16 and to adjust the damping force characteristics in the side of extension of the front fork F (damping force characteristics with respect to the speed of extension/contraction).

On the other hand, when rotating the second adjuster 6, the second adjuster 6 is screwed in the second adjuster case 46 that is included in a part of the cap 4 and can be moved axially with respect to the cap 4 so that the second adjustment rod 8 in contact with the contact portion 62 can be moved axially. Therefore, due to the rotation of the second adjuster 6 with respect to the cap 4, it is possible to change the amounts of compression of the coil spring 20 so as to change the valve opening pressure of the leaf valve in the side of compression 13, and to adjust the damping force characteristics in the side of compression of the front fork F (damping force characteristics with respect to the speed of extension/contraction).

As described above, in the front fork F according to an embodiment of the present invention, the contact portion 52 of the first adjuster 5 and the contact portion 62 of the second adjuster 6 are disposed so as to be displaced from each other in the axial direction, and the contact portion 52 of the first adjuster 5 is disposed so as not to interfere with the second adjuster case 47 of the second adjuster 6. Therefore, even when each of the first and second adjusters 5, 6 moves in the axial direction with respect to the cap 4, the corresponding first and second adjustment rods 7, 8 can be moved independently without being interfered with each other. Thus, in the front fork F according to an embodiment of the present invention, there is no need to provide a component that requires prevention of rotation such as an adjuster nut to be connected to the first and second adjusters 5, 6, which has been required conventionally, so that the structure of the first and second adjusters 5, 6 can be greatly simplified.

When the first adjuster 5 in contact with the first adjustment rod 7 disposed in the center, as viewed in the axial direction of the vehicle body tube 2, is provided to a position overlapping with the center of the cap 4, as viewed in the axial direction of vehicle body tube 2, the contact portion 52 can be decreased in diameter. Since the contact portion 52 can be made small, arrangement of the second adjuster 6 can be freely designed in respect that the second adjuster 6 avoids interfering with the contact portion 62, which enhances the degree of freedom in regard to designing. It should be noted that the first and second adjusters 5, 6 can be disposed in positions eccentric to the center, as viewed in the axial direction of the vehicle body tube 2, with respect to the cap 4, that is, in positions where the body 51 of the first adjuster 5 and the body 61 of the second adjuster 6 are deviated from the center of the cap 4 as viewed in the axial direction.

In order to attach the first and second adjusters 5, 6 to the cap 4 so as to be axially movable, a structure other than screwing may be employed. For example, it is possible to employ a structure in which the first and second adjusters 5, 6 move forward and backward with respect to the cap 4 so that they can be positioned at a plurality of positions using the detent mechanism. However, as in the front fork F of the present embodiment, as the first and second adjusters 5, 6 are screwed in the cap 4 and configured to be axially movable with respect to the cap 4 by being rotated in the circumferential direction, it is possible to greatly simplify not only the structure to move axially but also the operation to move.

Still further, there are the following advantages in a case where the cap 4 includes the cap body 40 having the first hole 43 and the second hole 44 into which the second adjuster 6 is inserted; the first adjuster case 45 mounted on the first hole 43; and the second adjuster case 46 mounted on the second hole 44. Since the tubular first adjuster case 45 in which the first adjuster 5 is screwed and the tubular second adjuster case 46 in which the second adjuster 6 is screwed are formed separately from the cap body 40, it is possible to contain cost material. In a case where the first and second adjuster cases 45, 46 are formed in an integrated manner from the same base material as the cap body 40, it is necessary to increase a wall thickness of the lid portion 41 to secure an axial length of the first and second adjuster cases 45, 46. On the other hand, since the first and second adjuster cases 45, 46 herein are formed separately from the cap body 40, it is possible to make the lid portion 41 of the cap body 40 thin. Furthermore, as the polygonal inner peripheral portions 45a, 46a and the screw grooves 45b, 46b are provided to the tubular first and second adjuster cases 45, 46, processing is easier than a case where they are provided to the cap body 40 so that it is possible to reduce processing cost. Making the body 51 of the first adjuster 5 and the body 61 of the second adjuster 6 have the same outer diameter and making the first and second adjuster cases 45, 46 have the same shape, the first and second adjuster cases 45, 46 can be made as common parts so that it is possible to reduce manufacturing cost.

There is the following advantage in a case where the first detent mechanism DH1 that circumferentially positions the first adjuster 5 at a plurality of positions is provided between the first adjuster case 45 and the first adjuster 5 and in a case where the second detent mechanism DH2 that circumferentially positions the second adjuster 6 at a plurality of positions is provided between the second adjuster case 46 and the second adjuster 6. Since the first and second adjusters 5, 6 are positioned at the plurality of positions in the circumferential direction, when a user adjusts the damping force characteristics of the front fork F, it is possible for the user himself/herself to grasp what kind of damping force characteristics are set at points where the first and second adjusters 5, 6 are positioned.

Furthermore, the front fork F in the present embodiment includes the damper cartridge D housed in the fork main body 1. With the first adjustment rod 7 involved, the first adjuster 5 can change the flow passage areas of the variable damping valve (needle valve 16) of the damper cartridge D, and with the second adjustment rod 8 involved, the second adjuster 6 can change the spring forces of the coil spring 20 for biasing the leaf valve in the side of compression 13. Accordingly, it is possible to easily adjust the damping forces in the side of extension and in the side of compression of the front fork F by operating the first and second adjusters 5, 6.

The invention claimed is:

1. A front fork comprising:
 a fork main body in which a vehicle body tube and an axle tube are slidably fitted;
 a cap configured to close an end portion of the vehicle body tube;
 a first adjuster and a second adjuster non-coaxially mounted on the cap, each one of the first adjuster and the second adjuster being independently axially movable with respect to the cap;
 a first adjustment rod housed in the vehicle body tube, and disposed in the center of the vehicle body tube; and
 a second adjustment rod housed in the vehicle body tube, disposed on an outer periphery of the first adjustment rod, and having a tubular shape,
 wherein the first adjuster has a columnar body including a first contact portion in direct contact with an end face of the first adjustment rod that is closest to the cap,
 wherein the second adjuster has a columnar body including a second contact portion in direct contact with an end face of the second adjustment rod that is closest to the cap, and wherein the first contact portion and the second contact portion are displaced in an axial direction of the vehicle body tube so as not to interfere with each other.

2. The front fork according to claim 1, wherein the first adjuster is provided at a position that overlaps the center of the cap as viewed in the axial direction of the vehicle body tube.

3. The front fork according to claim 1, wherein the first adjuster and the second adjuster are screwed in the cap and are axially movable with respect to the cap by being rotated in a circumferential direction.

4. The front fork according to claim 1,
wherein the cap includes a cap body having a first hole into which the first adjuster is inserted and a second hole into which the second adjuster is inserted, and
wherein the front fork further comprises:
a first adjuster case having a tubular shape, including an inner periphery in which the first adjuster is screwed, fitted with the first hole so as to mount the first adjuster to the cap body; and
a second adjuster case having a tubular shape, including an inner periphery in which the second adjuster is screwed, fitted with the second hole so as to mount the second adjuster to the cap body.

5. The front fork according to claim 4, further comprising: a first detent mechanism provided between the first adjuster case and the first adjuster; and a second detent mechanism provided between the second adjuster case and the second adjuster.

6. The front fork according to claim 1, further comprising:
a damper cartridge housed in the fork main body,
wherein the damper cartridge includes:
a cylinder connected to the axle tube;
a piston rod inserted into the cylinder so as to be axially movable, being connected to the cap, and being hollow;
a piston connected to the piston rod, partitioning the interior of the cylinder into a chamber in the side of extension and a chamber in the side of compression;
a port in the side of extension and a port in the side of compression provided to the piston, allowing the chamber in the side of extension to communicate with the chamber in the side of compression;
a leaf valve in the side of extension configured to open/close the port in the side of extension;
a leaf valve in the side of compression configured to open/close the port in the side of compression;
a bypass passage configured to bypass the port in the side of extension and the port in the side of compression and to allow the chamber in the side of extension to communicate with the chamber in the side of compression;
a variable damping valve provided to the bypass passage, configured to change flow passage areas by movement of the first adjustment rod; and
an adjustment spring interposed between the leaf valve in the side of compression and the second adjustment rod, and
the first adjustment rod and the second adjustment rod are inserted into the piston rod.

7. The front fork according to claim 1, wherein the first adjuster and the second adjuster are non-coaxially mounted directly on the cap.

* * * * *